(12) United States Patent
Miyazaki

(10) Patent No.: US 7,535,124 B2
(45) Date of Patent: May 19, 2009

(54) VOLTAGE STABILIZER

(75) Inventor: Takahiro Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 11/113,016

(22) Filed: Apr. 25, 2005

(65) Prior Publication Data
US 2006/0109593 A1 May 25, 2006

(30) Foreign Application Priority Data
Nov. 24, 2004 (JP) ............... 2004-339058

(51) Int. Cl.
*G05F 1/62* (2006.01)
*H02J 1/00* (2006.01)
*H02M 3/06* (2006.01)

(52) U.S. Cl. .................. 307/102; 323/298; 323/353; 363/72; 363/80; 363/81; 363/88; 363/89

(58) Field of Classification Search ............. 323/298, 323/353; 363/65, 71, 72, 80, 81, 88, 89; 307/102
See application file for complete search history.

(56) References Cited

U.S. PATENT DOCUMENTS 5,561,596 A * 10/1996 Hemena et al. ............... 363/50
2005/0128657 A1 * 6/2005 Covault ........................ 361/18

FOREIGN PATENT DOCUMENTS

| JP | HEI05-25945 Y | 4/1993 |
| JP | 8-194549 | 7/1996 |
| JP | 2003-079139 A1 | 3/2003 |
| JP | 2003-324959 A1 | 11/2003 |

* cited by examiner

*Primary Examiner*—Albert W Paladini
*Assistant Examiner*—Hal I Kaplan
(74) *Attorney, Agent, or Firm*—Arent Fox LLP.

(57) ABSTRACT

The voltage stabilizer for stabilizing a voltage of a circuit includes a first resistor, a second resistor, a voltage controller, and a current supply unit. The voltage controller keeps a voltage of the first resistor constant. The current supply unit supplies a first current to between the first resistor and the second resistor when a second current in the circuit becomes equal to or larger than a predetermined value.

10 Claims, 11 Drawing Sheets

VOLTAGE STABILIZER

BACKGROUND OF THE INVENTION

1) Field of the Invention

The present invention relates to a voltage stabilizer that stabilizes a voltage of a circuit.

2) Description of the Related Art

Conventionally, a power supply circuit that is connected to a battery has a problem in that after the power supply circuit passes an excessive current from the battery, the voltage of the battery drops rapidly and the output voltage of the power supply circuit becomes unstable. Therefore, a power supply control circuit is used to stabilize the output voltage of the power supply circuit.

The power supply control circuit obtains signals of two systems concerning the current that flows through the power supply circuit and the output voltage of the power supply circuit. Based on the obtained signals of the two systems, the power supply control circuit determines the current and the voltage of the power supply circuit. When an excessive current flows through the power supply circuit, the power supply control circuit controls the current from the battery, thereby stabilizing the voltage of the power supply circuit (see, for example, Japanese Utility Model Application Laid-Open No. H5-25945).

FIG. 11 is an example of a conventional power supply circuit. As shown in FIG. 11, this power supply circuit has a battery 10 that generates electromotive force, a load 20 that applies load to the power supply circuit, and a direct current to direct current (DC-DC) converter 30 that converts a direct current at a voltage of the battery 10 to a direct current at a different voltage.

The DC-DC converter 30 has a capacitors 40a and 40b, a diode 50, a transistor 60, a coil 70, voltage dividing resistors 80 and 90, a current detecting circuit 100, and a power supply control circuit 110.

The voltage dividing resistors 80 and 90 are used to detect an output voltage of the power supply circuit. The current detecting circuit 100 detects a size of a current that flows from the battery 10. The power supply control circuit 110 is connected to the current detecting circuit 100, an intermediate point between the voltage dividing resistors 80 and 90, and the transistor 60. The power supply control circuit 110 obtains a signal concerning a current from the current detecting circuit 100, obtains a signal concerning an output voltage from the intermediate point between the voltage dividing resistors 80 and 90, and controls the transistor 60.

In other words, the power supply control circuit 110 obtains signals of the two systems of the output voltage and the current of the power supply circuit, from the intermediate point between the voltage dividing resistors 80 and 90, and from the current detecting circuit 100. When an excessive current flows from the battery 10, the power supply control circuit 110 controls the transistor 60 to prevent the flow of the excessive current, thereby stabilizing the output voltage of the power supply circuit.

According to the conventional technique, however, circuit parts that are used generally cannot be used to prepare the power supply control circuit of the power supply circuit having an inherent characteristic. It is necessary to develop own circuit parts corresponding to individual power supply circuits, to prepare the power supply control circuit, which requires an enormous amount of cost.

In integrating circuit parts and preparing the power supply control circuit using integrated circuit (IC) chips to respond to the requirement for miniaturization of the power supply control circuit, IC chips that can handle control signals of two or more systems are necessary. However, such IC chips are not available and therefore need to be developed, which is a more important task.

In other words, it is considerably important to stabilize the output voltage of the power supply circuit using circuit parts that are generally used without providing a special power supply control circuit in the power supply circuit.

SUMMARY OF THE INVENTION

It is an object of the present invention to at least solve the problems in the conventional technology.

The voltage stabilizer according to an aspect of the present invention is a voltage stabilizer that includes a first resistor; a second resistor; a voltage controller that keeps a voltage of the first resistor constant; and a current supply unit that supplies a first current to between the first resistor and the second resistor when a second current in the circuit becomes equal to or larger than a predetermined value.

The voltage stabilizing method according to another aspect of the present invention is a voltage stabilizing method for stabilizing a voltage of a circuit with a first resistor and a second resistor serially connected, and includes keeping a voltage of the first resistor constant; and supplying a first current to between the first resistor and the second resistor when a second current in the circuit becomes equal to or larger than a predetermined value.

The other objects, features, and advantages of the present invention are specifically set forth in or will become apparent from the following detailed description of the invention when read in conjunction with the accompanying drawings.

DETAILED DESCRIPTION

Exemplary embodiments of a voltage stabilizer according to the present invention will be explained in detail below with reference to the accompanying drawings.

Figure 1:
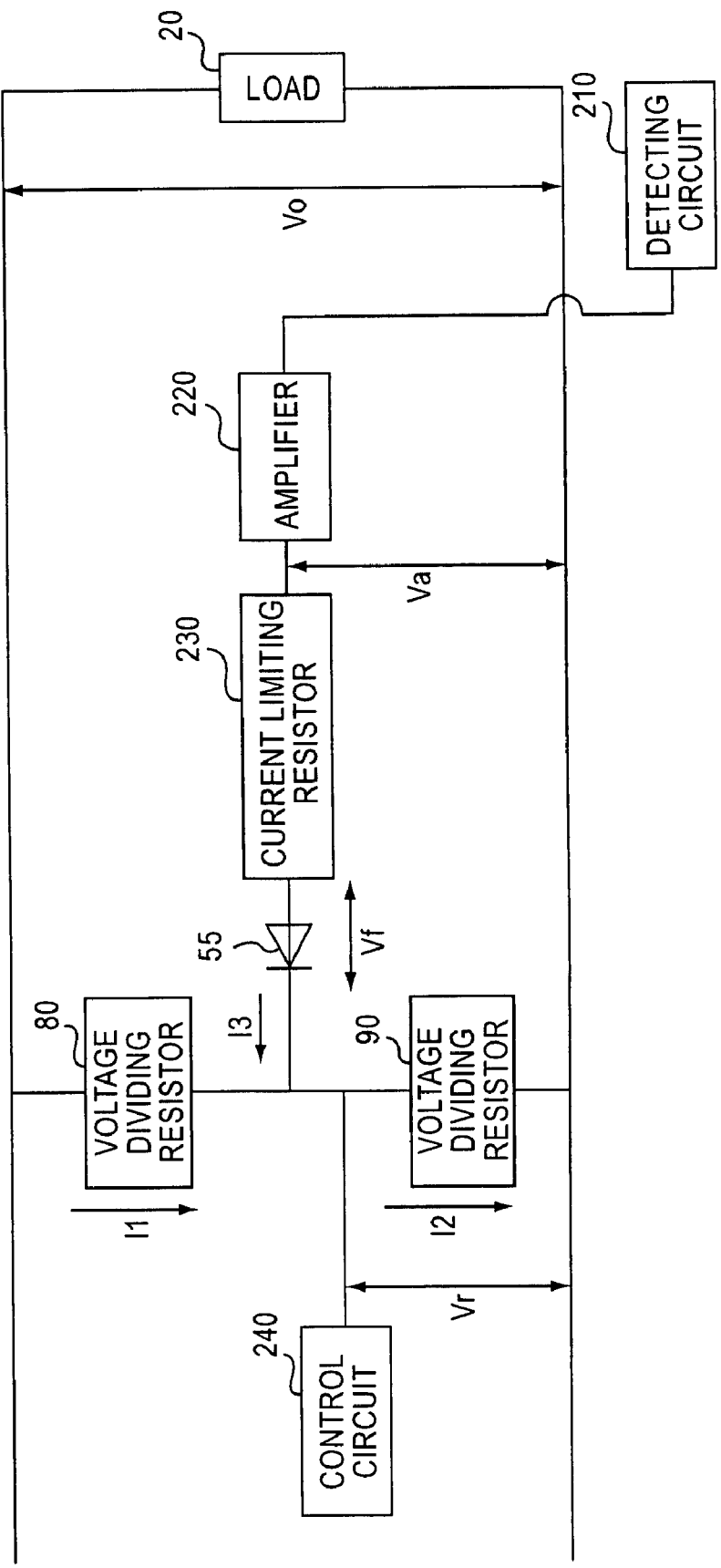
FIG. 1 is an explanatory diagram of the concept of voltage stabilization according to a first embodiment of the present invention.

FIG. 1 is an explanatory diagram of the concept of voltage stabilization according to the first embodiment. As shown in FIG. 1, a power supply circuit 300 has the load 20, a diode 55, the voltage dividing resistors 80 and 90, a detecting circuit 210, an amplifier 220, a current limiting resistor 230, and a control circuit 240. The load 20 and the voltage dividing resistors 80 and 90 are similar to the load and the voltage dividing resistors explained in the conventional technique, and therefore, their explanation is omitted.

The diode 55 is an electronic part that passes a current to one direction, like the diode 50 explained in the conventional technique. According to the first embodiment, Vf denotes a drop voltage of the diode 55. The diode 55 is connected to an intermediate point between the voltage dividing resistors 80 and 90, and to the current limiting resistor 230. A current flows from the current limiting resistor 230 to the voltage dividing resistor 90.

The detecting circuit 210 detects a current that flows through the power supply circuit 300, and passes a signal of the detected current of the power supply circuit 300 to the amplifier 220. The amplifier 220 amplifies a signal of a current obtained from the detecting circuit 210.

The current limiting resistor 230 suitably adjusts a total gain of a feedback circuit at the time of controlling the voltage. The current limiting resistor 230 prevents the total gain of the feedback circuit from increasing from the gain during a normal operation at the time of controlling the voltage, thereby preventing the voltage control from becoming unstable.

The control circuit 240 keeps the voltage across the voltage dividing resistor 90 constant. The control circuit 240 is connected to an intermediate point between the voltage dividing resistor 80 and the voltage dividing resistor 90. According to the first embodiment, the control circuit 240 keeps the voltage (a reference voltage) across the voltage dividing resistor 90 at Vr. Therefore, a current 12 that flows to the voltage dividing resistor 90 becomes always constant.

Assume that R1 denotes a resistance of the voltage dividing resistor 80, and R2 denotes a resistance of the voltage dividing resistor 90. Then, an output voltage Vo of the power supply circuit 300 is expressed as follows.

$$Vo = \frac{R1 + R2}{R2} \times Vr \quad (1)$$

When a current I3 flows from the diode 55 to the voltage dividing resistor 90, the control circuit 240 controls a current I2 to become constant. Therefore, a current I1 that flows from the voltage dividing resistor 80 decreases. As a result, the voltage across the voltage dividing resistor 80 drops, and the output voltage of the power supply circuit 300 drops.

Assume that Va denotes an output voltage of the amplifier 220. Then, when an output voltage Va of the amplifier 220 is smaller than a sum of a drop voltage Vf of the diode 55 and the reference voltage Vr between both ends of the voltage dividing resistor 90, the output voltage Vo of the power supply circuit 300 is expressed as follows.

$$Vo = \frac{R1 + R2}{R2} \times Vr \quad (1)$$

When the output voltage Va is equal to or larger than the sum of the drop voltage Vf of the diode 55 and the reference voltage Vr across the voltage dividing resistor 90, the output voltage Vo is expressed as follows.

$$Vo = \frac{R1 + R2}{R2} \times Vr - \frac{R1}{R3} \times (Va - Vf - Vr) \quad (2)$$

In other words, when the output voltage Va is equal to or larger than the sum of the drop voltage Vf and the reference voltage Vr, the output voltage Vo of the power supply circuit 300 drops. In the expression (2), R3 denotes a resistance of the current limiting resistor 230.

The output voltage Va of the amplifier 220 becomes large when the current that flows through the power supply circuit 300 becomes large. When an excessive current flows through the power supply circuit 300, the output voltage Va becomes larger than the sum of the drop voltage Vf and the reference voltage Vr, thereby lowering the output voltage Vo of the power supply circuit 300. Consequently, the voltage of the power supply circuit 300 can be stabilized.

Figure 2:
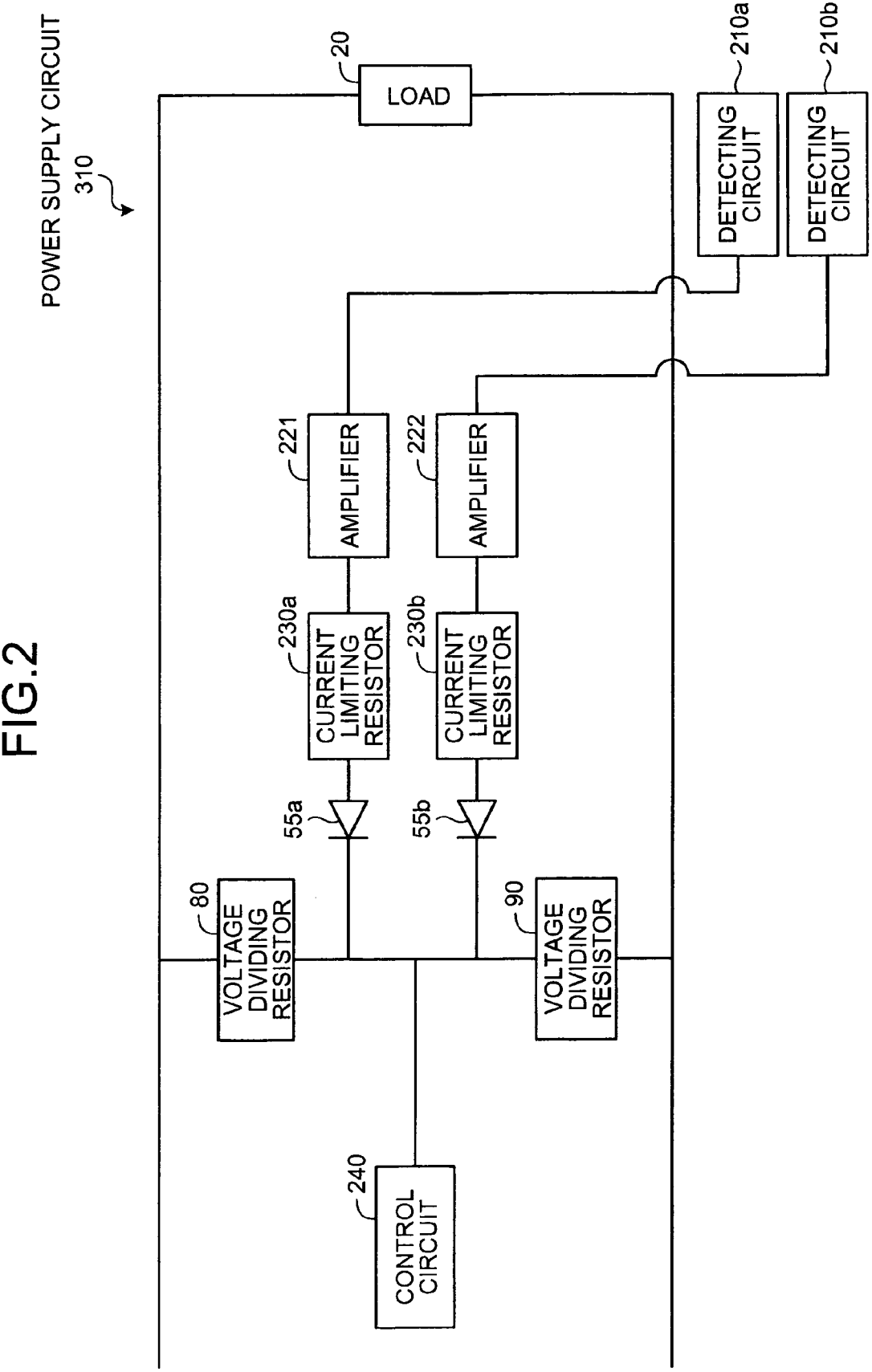
FIG. 2 is an example of OR connection of circuits that control an output voltage.

A circuit that controls the output voltage can be OR connected between the voltage dividing resistors 80 and 90. FIG. 2 is an example of OR connection of circuits that control an output voltage, between the voltage dividing resistors. As shown in FIG. 2, a power supply circuit 310 has diodes 55a and 55b, current limiting resistors 230a and 230b, amplifiers 221 and 222, and detecting circuits 210a and 210b. Other configurations and operations are similar to those of the power supply circuit 300 shown in FIG. 1, and therefore, like reference numerals denote like constituent elements and their explanation is omitted.

The diodes 55a and 55b, the current limiting resistors 230a and 230b, the amplifiers 221 and 222, and the detecting circuits 210a and 210b are similar to the diode 55, the current limiting resistor 230, the amplifier 220, and the detecting circuit 210, shown in FIG. 1 respectively. Therefore, their explanation is omitted.

As explained above, two circuits that control the output voltage are OR connected between the voltage dividing resistors 80 and 90. With this arrangement, even when the resistance of the current limiting resistor 230a decreases, the diode 55b, the current limiting resistor 230b, the amplifier 222, and the detecting circuit 210b can keep the current that flows from the amplifier 221 constant. While the OR connection of the two circuits that control the output voltage is shown in FIG. 2, two or more circuits can be connected between the voltage dividing resistors 80 and 90.

Figure 3:
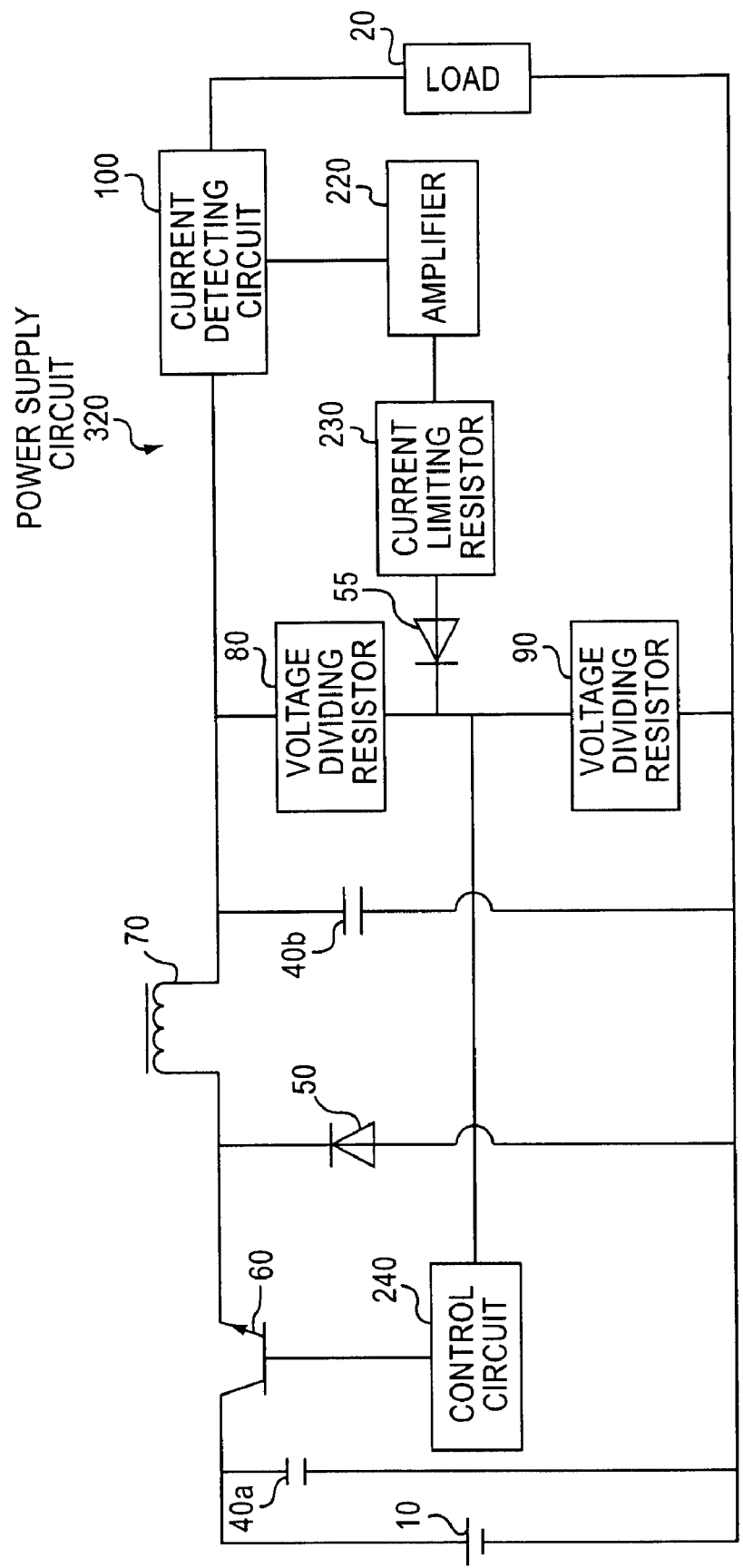
FIG. 3 is an example of application of a power supply circuit shown in FIG. 1 to a power supply circuit explained in the conventional technique.
Figure 11:
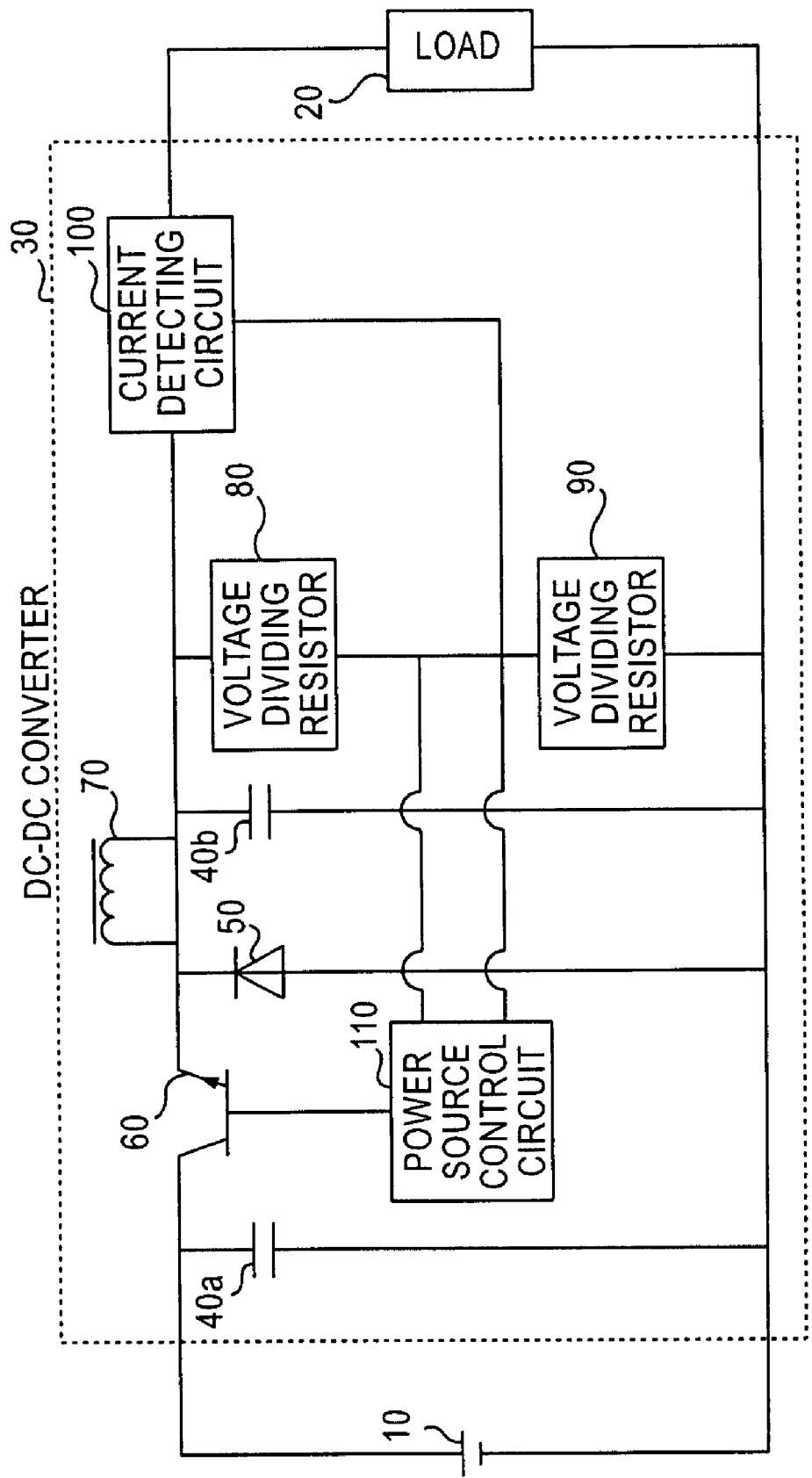
FIG. 11 is an example of a conventional power supply circuit.

FIG. 3 is an example of application of the circuit shown in FIG. 1 to the power supply circuit shown in FIG. 11. As shown in FIG. 3, the amplifier 220 of a power supply circuit 320 is connected to a current detecting circuit 100 and the current limiting resistor 230. The current limiting resistor 230 is connected to an intermediate point between the voltage dividing resistor 80 and 90, via the diode 55.

Other configurations and operations are similar to those of the power supply circuit shown in FIG. 11, and therefore, like reference numerals denote like constituent elements and their explanation is omitted.

When an excessive current flows to the power supply circuit 320 (when the voltage of the amplifier 220 becomes equal to or larger than the sum of the drop voltage of the diode 55 and the voltage across the voltage dividing resistor 90), the current flows from the diode 55 to the voltage dividing resistor 90, and the current that flows to the voltage dividing resistor 80 decreases. Therefore, the output voltage of the power supply circuit 320 drops.

Figure 4:
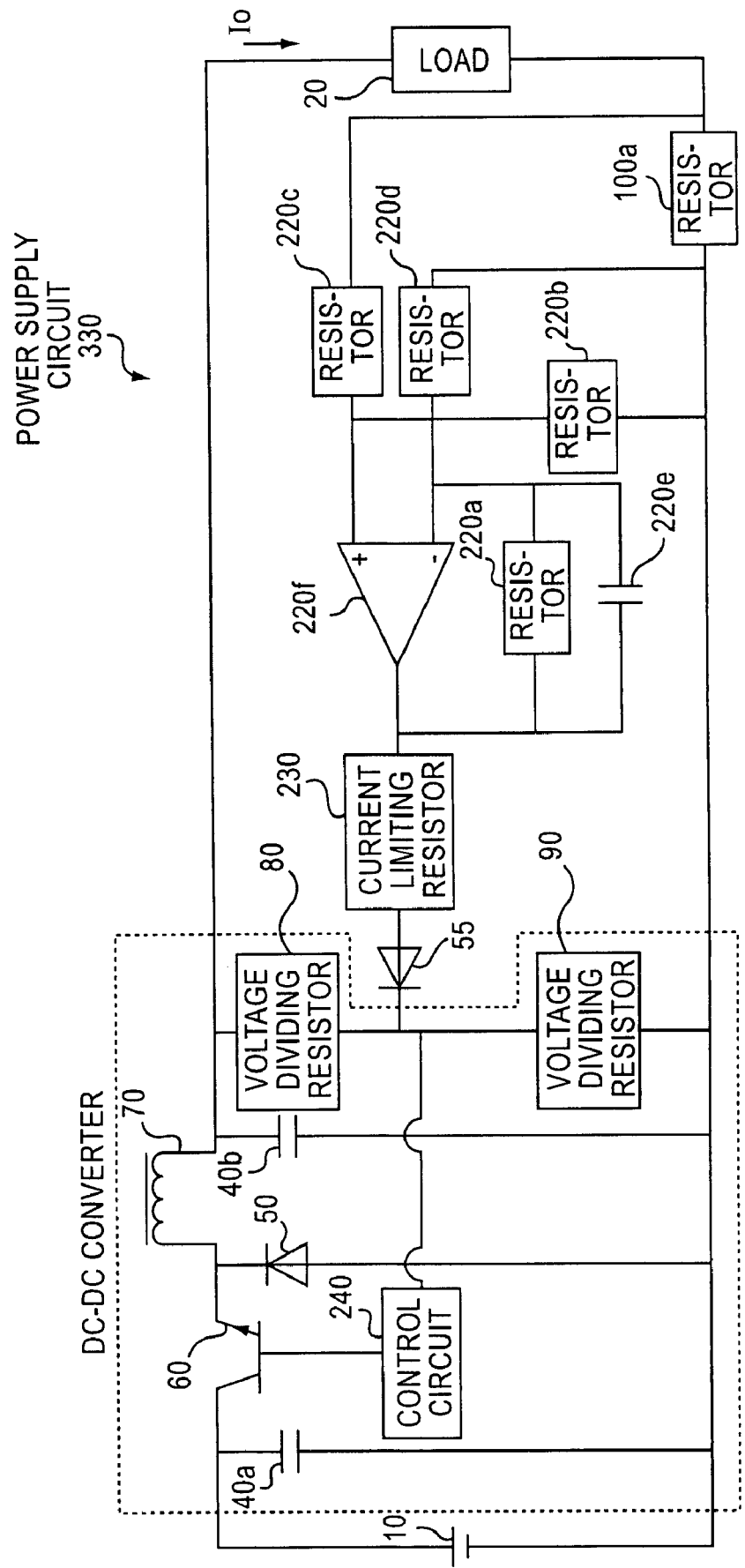
FIG. 4 is a functional block diagram of a configuration of a power supply circuit according to the first embodiment.

FIG. 4 is a functional block diagram of the configuration of the power supply circuit according to the first embodiment. As shown in FIG. 4, a power supply circuit 330 has resistors 100a, 220a, 220b, 220c, and 220d, a capacitor 220e, and an operational amplifier 220f. Other configurations and operations are similar to those of the power supply circuit 320 shown in FIG. 3, and therefore, like reference numerals denote like constituent elements and their explanation is omitted. While a step-down switching power supply circuit is used as a DC-DC converter in FIG. 4, other DC-DC converters, such as a step-up switching power supply circuit, can be also used.

The resistor 100a is a current detecting resistor. The resistors 220a, 220b, 220c, and 220d are used to determine gain of the operational amplifier 220f. The capacitor 220e is a compensation capacitor for the operational amplifier 220f.

The operational amplifier 220f is a high-gain amplifier that amplifies a difference between voltages of a plus terminal (a noninverting input terminal) and a minus terminal (an inverting input terminal) to about $10^3$ to $10^6$ times, and outputs the amplified result.

When a current Io flows to the output of the power supply circuit 330, a potential of Io×R8 occurs (where R8 is a resistance of the resistor 100a according to the first embodiment) across the resistor 100a. In this case, the output voltage Va of the operational amplifier 220f is expressed as A×Io×R8, where A is the gain of the operational amplifier 220f.

Assume that Vf denotes a drop voltage of the diode 55, Vr denotes voltage (hereinafter, a reference voltage) across the voltage dividing resistor 90, and Va denotes an output voltage of the operational amplifier 220f (where the value of Va is equal to the value of A×Io×R8). When the output voltage Va is smaller than the sum of the drop voltage Vf and the reference voltage Vr, the diode 55 blocks the output of the operational amplifier 220f, and a current cannot be passed to the voltage dividing resistor 90.

In other words, under the following condition shown in an expression (3), the output voltage of the power supply circuit 330 is not affected by the voltage control operation of the present invention, and the power supply circuit 330 executes a normal output operation.

$$Io < \frac{(Vf + Vr)}{A \times R8} \tag{3}$$

On the other hand, when the condition shown in the expression (3) is not satisfied (in other words, the output voltage Va becomes equal to or larger than the sum of the drop voltage Vf and the reference voltage Vr), the output of the operational amplifier 220f passes through the diode 55, and the current flows to the voltage dividing resistor 90. Therefore, the current that flows to the voltage dividing resistor 80 decreases, thereby dropping the output voltage Vo of the power supply circuit 330.

As described above, according to the first embodiment, the control circuit 240 of the power supply circuit 330 keeps the voltage across the voltage dividing resistor 90 constant. When the output current Io increases to make the output voltage Va of the operational amplifier 220f equal to or larger than the sum of the drop voltage Vf of the diode 55 and the reference voltage Vr between both ends of the voltage dividing resistor 90, the output of the operational amplifier 220f passes through the diode 55, and flows to the voltage dividing resistor 90. Since the current that flows through the voltage dividing resistor 90 is constant, the current that flows to the voltage dividing resistor 80 decreases, and the output voltage of the power supply circuit 330 drops. Therefore, the output voltage can be stabilized without using a special power supply control circuit.

A second embodiment of the present invention is explained next. A power supply circuit according to the second embodiment of the present invention controls the output voltage by controlling an input current when the input current increases.

Figure 5:
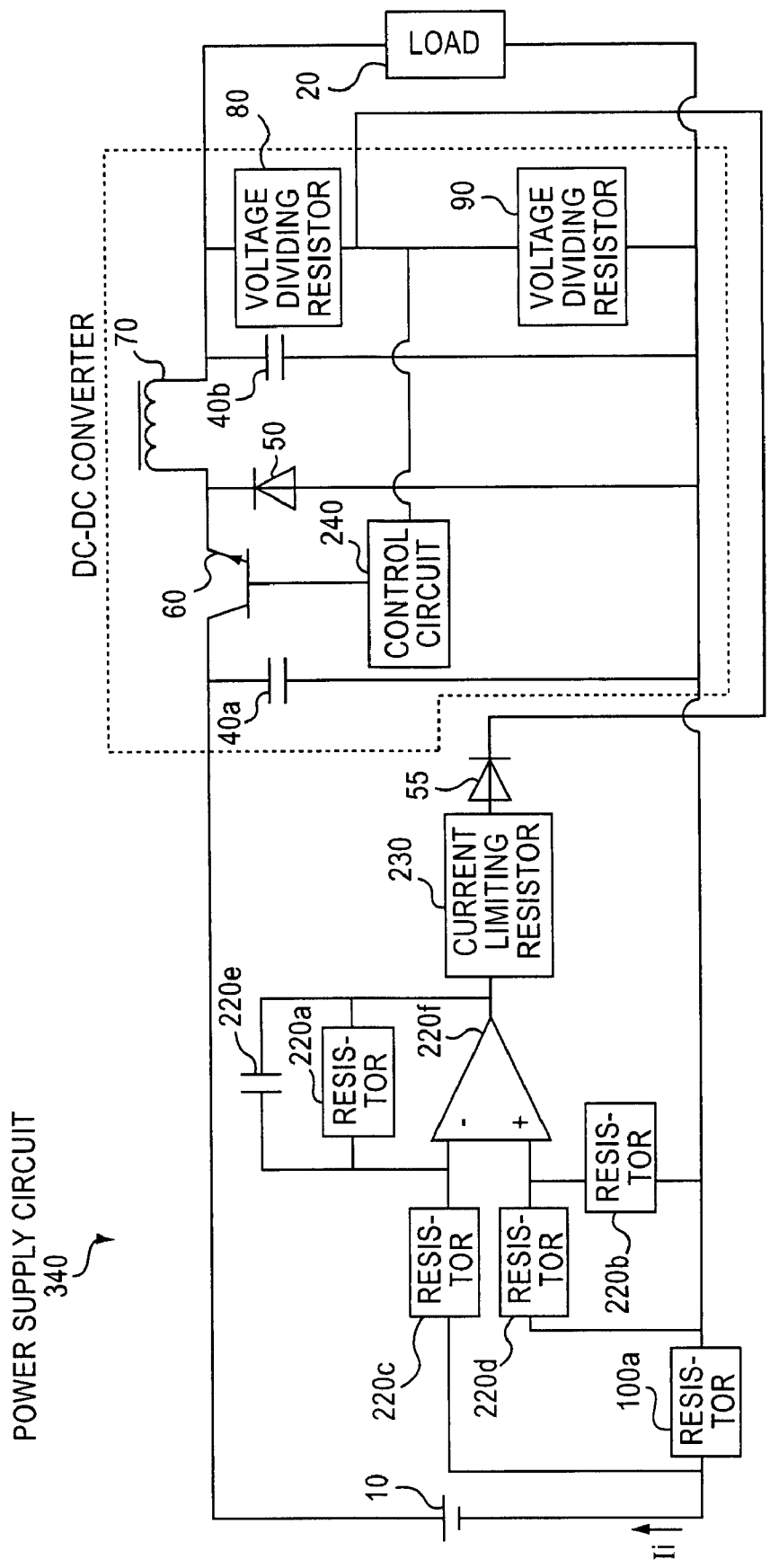
FIG. 5 is a functional block diagram of a configuration of a power supply circuit according to a second embodiment.

FIG. 5 is a functional block diagram of the configuration of the power supply circuit according to the second embodiment. As shown in FIG. 5, a power supply circuit 340 has the diode 55, the resistors 100a, 220a, 220b, 220c, and 220d, the capacitor 220e, the operational amplifier 220f, and the current limiting resistor 230. Other configurations and operations are similar to those of the power supply circuit 320 shown in FIG. 3, and therefore, like reference numerals denote like constituent elements and their explanation is omitted. While a step-down switching power supply circuit is used as a DC-DC converter in FIG. 5, other DC-DC converters, such as a step-up switching power supply circuit, can be also used.

The diode 55, the resistors 100a, 220a, 220b, 220c, and 220d, the capacitor 220e, the operational amplifier 220f, and the current limiting resistor 230 are similar to the diode, the resistors, the capacitor, the operational amplifier, and the current limiting resistor shown in FIG. 4, respectively, and therefore, like reference numerals denote like elements and their explanation is omitted.

When a current Ii flows to the input of the power supply circuit 340, a potential of Ii×R8 occurs (where R8 is a resistance of the resistor 100a according to the second embodiment) across the resistor 100a. In this case, the output voltage of the operational amplifier 220f is expressed as A×Ii×R8, where A is the amplification of the operational amplifier 220f.

Assume that Vf denotes a drop voltage of the diode 55, Vr denotes voltage (a reference voltage) across the voltage dividing resistor 90, and Va denotes an output voltage of the operational amplifier 220f (where the value of Va is equal to the value of A×Ii×R8). When the output voltage Va is smaller than the sum of the drop voltage Vf and the reference voltage Vr, the diode 55 blocks the output of the operational amplifier 220f, and a current cannot be passed to the voltage dividing resistor 90.

In other words, under the following condition shown in an expression (4), the output voltage of the power supply circuit 340 is not affected by the voltage control operation of the present invention, and the power supply circuit 340 executes a normal output operation.

$$Ii < \frac{(Vf + Vr)}{A \times R8} \tag{4}$$

On the other hand, when the condition shown in the expression (4) is not satisfied (in other words, the output voltage Va of the operational amplifier 220f becomes equal to or larger than the sum of the drop voltage Vf and the reference voltage Vr), the output of the operational amplifier 220f passes through the diode 55, and the current flows to the voltage dividing resistor 90. Therefore, the current that flows to the voltage dividing resistor 80 decreases, thereby dropping the output voltage Vo of the power supply circuit.

As described above, according to the second embodiment, the control circuit 240 of the power supply circuit 340 keeps the voltage between both ends of the voltage dividing resistor 90 constant. When the input current Ii increases to make the output voltage Va of the operational amplifier 220f equal to or larger than the sum of the drop voltage Vf of the diode 55 and the reference voltage Vr between both ends of the voltage dividing resistor 90, the output of the operational amplifier 220f passes through the diode 55, and flows to the voltage dividing resistor 90. Since the current that flows through the voltage dividing resistor 90 is constant, the current that flows to the voltage dividing resistor 80 decreases, and the output voltage of the power supply circuit 340 drops. Therefore, the output voltage can be stabilized without developing a special power supply control circuit.

A third embodiment of the present invention is explained next. A power supply circuit according to the third embodiment controls the output voltage when the input voltage of the power supply circuit drops, thereby protecting the input.

Figure 6:
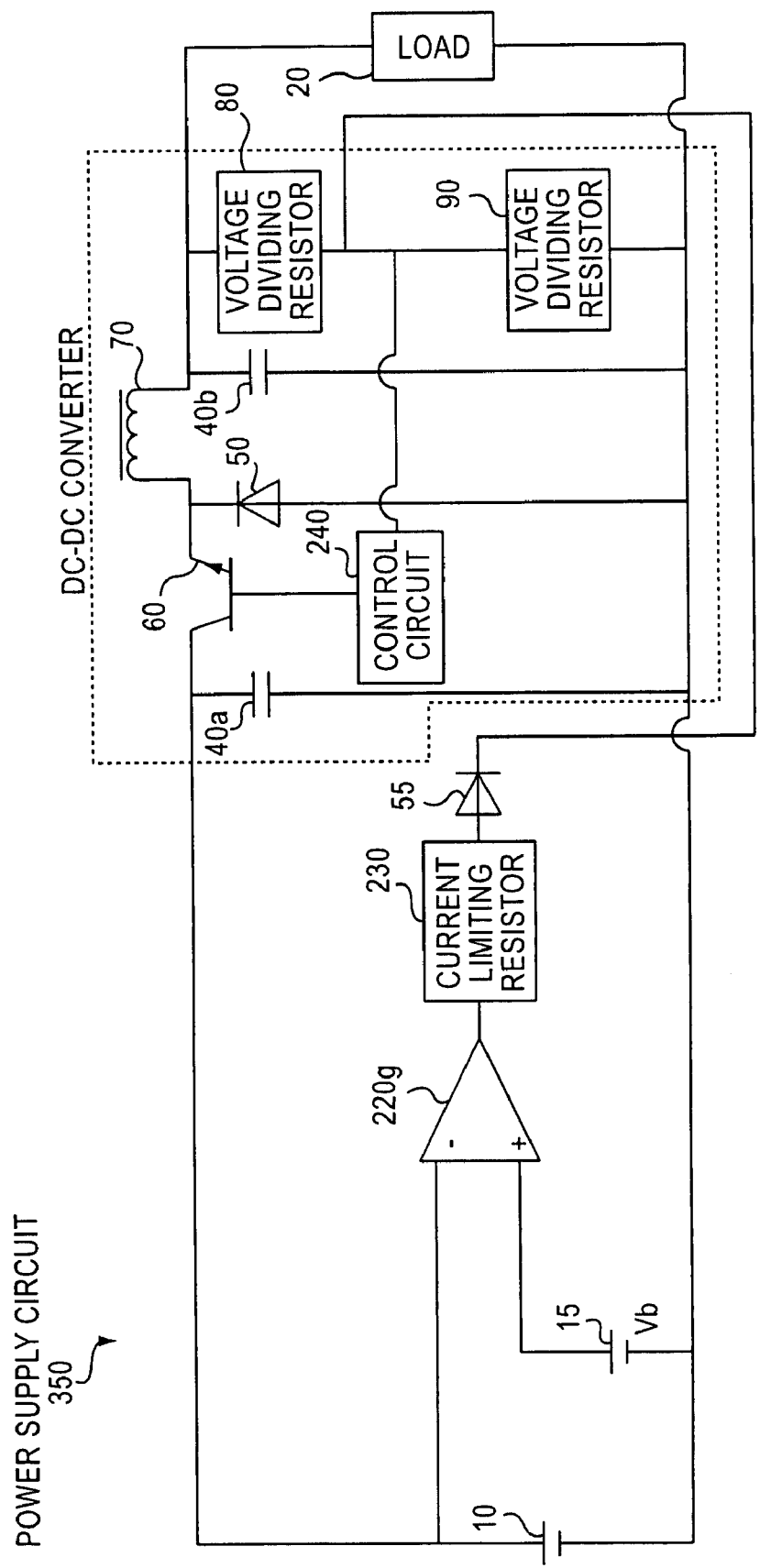
FIG. 6 is a functional block diagram of a configuration of a power supply circuit according to a third embodiment.

FIG. 6 is a functional block diagram of the configuration of the power supply circuit according to the third embodiment. As shown in FIG. 6, a power supply circuit 350 has batteries 10 and 15, the load 20, the diode 55, a comparator 220g, and the current limiting resistor 230. Other configurations and operations are similar to those of the DC-DC converter shown in FIG. 4, and therefore, like reference numerals denote like constituent elements and their explanation is omitted. While a step-down switching power supply circuit is used as a DC-DC converter in FIG. 6, other DC-DC converters, such as a step-up switching power supply circuit, can be also used. In place of the comparator, an amplifier having any gain A can be used.

The battery 10, the load 20, the diode 55, and the current limiting resistor 230 are similar to the battery 10, the load 20, the diode 55, and the current limiting resistor 230 shown in FIG. 5, and therefore, their explanation is omitted. The comparator 220g is a circuit that compares a voltage of the battery 10 with a voltage of the battery 15. The battery 15 is used to generate a reference voltage Vb.

Assume that Vf denotes a drop voltage of the diode 55, Vr denotes voltage (a reference voltage) between both ends of the voltage dividing resistor 90, and Va denotes an output voltage of the comparator 220g. When the output voltage Va is smaller than the sum of the drop voltage Vf and the reference voltage Vr, the diode 55 blocks the output of the comparator 220g, and a current cannot be passed to between the voltage dividing resistors 80 and 90.

In other words, when an input voltage Vin of the power supply circuit 350 is larger than the reference voltage Vb (Vin>Vb), the output voltage of the power supply circuit 350 is not affected by the voltage control operation of the present invention, and the power supply circuit 350 executes a normal output operation.

However, when the input voltage Vin is equal to or smaller than the reference voltage Vb, the output voltage Va of the comparator 220g becomes equal to or larger than the sum of the drop voltage Vf of the diode 55 and the voltage Vr across the voltage dividing resistor 90. The output of the comparator 220g passes through the diode 55, and flows to the voltage dividing resistor 90. Therefore, the current that flows to the voltage dividing resistor 80 decreases, thereby dropping the output voltage Vo of the power supply circuit 350.

As described above, according to the third embodiment, the control circuit 240 of the power supply circuit 350 keeps the voltage between both ends of the voltage dividing resistor 90 constant. When the input voltage Vin decreases to make the output voltage Va of the comparator 220g equal to or larger than the sum of the drop voltage Vf of the diode 55 and the reference voltage Vr between both ends of the voltage dividing resistor 90, the output of the comparator 220g passes through the diode 55, and flows to the voltage dividing resistor 90. Since the current that flows through the voltage dividing resistor 90 is constant, the current that flows to the voltage dividing resistor 80 decreases, and the output voltage of the power supply circuit 350 drops. Therefore, the output voltage can be stabilized using general-purpose circuit parts without developing a special power supply control circuit.

A fourth embodiment of the present invention is explained next. A power supply circuit according to the fourth embodiment controls the output voltage when the input current of the power supply circuit becomes equal to or larger than a certain value or when the input voltage becomes equal to or smaller than a certain value, thereby protecting the input.

Figure 7:
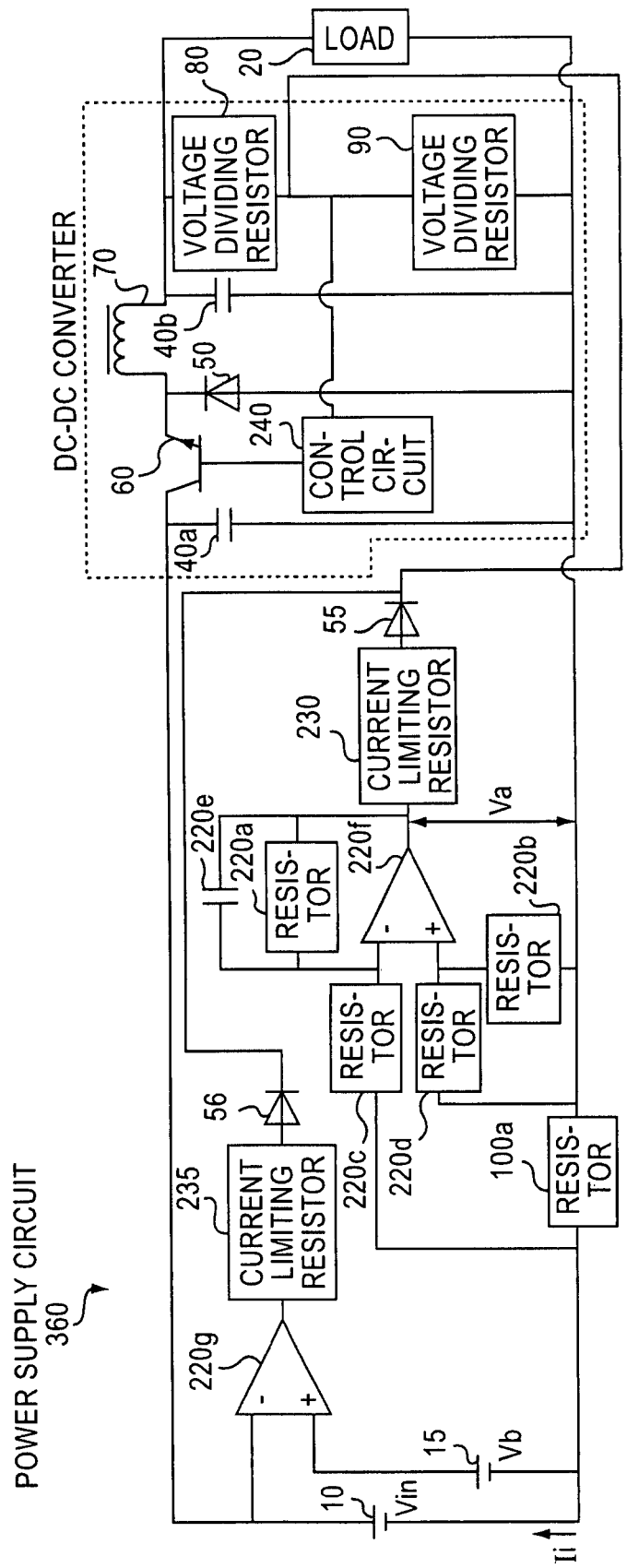
FIG. 7 is a functional block diagram of a configuration of a power supply circuit according to a fourth embodiment.

FIG. 7 is a functional block diagram of the configuration of the power supply circuit according to the fourth embodiment. As shown in FIG. 7, a power supply circuit 360 has the batteries 10 and 15, the load 20, the diodes 55 and 56, the resistors 100a, 220a, 220b, 220c, and 220d, the capacitor 220e, the operational amplifier 220f, the comparator 220g, and the current limiting resistors 230 and 235. Other configurations and operations are similar to those of the DC-DC converter shown in FIG. 4, and therefore, like reference numerals denote like constituent elements and their explanation is omitted. While a step-down switching power supply circuit is used as a DC-DC converter in FIG. 7, other DC-DC converters, such as a step-up switching power supply circuit, can be also used. In place of the comparator, an amplifier having any gain A can be used.

The batteries 10 and 15, the load 20, the diodes 55 and 56, the resistors 100a, 220a, 220b, 220c, and 220d, the capacitor 220e, the operational amplifier 220f, the comparator 220g, and the current limiting resistors 230 and 235 are similar to the batteries 10 and 15, the load 20, the diodes 55 and 56, the resistors 100a, 220a, 220b, 220c, and 220d, the capacitor 220e, the operational amplifier 220f, the comparator 220g, and the current limiting resistor 230 shown in FIG. 5 or FIG. 6, and therefore, their explanation is omitted.

When a current Ii flows to the input of the power supply circuit 360, a potential of Ii×R8 occurs (where R8 is a resistance of the resistor 100a according to the fourth embodiment) across the resistor 100a. The output voltage Va of the operational amplifier 220f is expressed as A×Ii×R8, where A is the gain of the operational amplifier 220f.

Assume that Vf denotes a drop voltage of the diode 55, Vr denotes voltage (a reference voltage) across the voltage dividing resistor 90, and Va denotes an output voltage of the operational amplifier 220f. When the output voltage Va is smaller than the sum of the drop voltage Vf and the reference voltage Vr, the diode 55 blocks the output of the operational amplifier 220f, and a current cannot be passed to the voltage dividing resistor 90.

In other words, under the following condition shown in an expression (4), the output voltage of the power supply circuit 360 is not affected by the voltage control operation of the present invention, and the power supply circuit 360 executes a normal output operation.

$$Ii < \frac{(Vf + Vr)}{A \times R8} \tag{4}$$

When the input voltage Vin is higher than the reference voltage Vb of the comparator 220g (Vin>Vb), the diode 56 blocks the output of the comparator 220g, and a current cannot be passed to the voltage dividing resistor 90. Therefore, when the condition of the expression (4) is satisfied, or when the input voltage Vin is higher than the reference voltage Vb of the comparator 220g, the output voltage of the power supply circuit 360 is not affected by the voltage control operation of the present invention, and the power supply circuit 360 executes a normal output operation.

However, when neither the condition of the expression (4) is satisfied nor Vin is larger than Vb, a current flows to the voltage dividing resistor 90 from the operational amplifier 220*f* or the comparator 220*g*, thereby controlling the output voltage of the power supply circuit 360.

Specifically, when the input current Ii does not satisfy the condition of the expression (4), the output voltage Va of the operational amplifier 220*f* becomes equal to or larger than the sum of the drop voltage Vf and the reference voltage Vr. The output of the operational amplifier 220*f* passes through the diode 55, and flows to the voltage dividing resistor 90. Therefore, the current that flows to the voltage dividing resistor 80 decreases, thereby dropping the output voltage Vo of the power supply circuit 360.

On the other hand, when the input voltage Vin becomes equal to or smaller than the reference voltage Vb, the output voltage of the comparator 220*g* becomes equal to or larger than the sum of a drop voltage Vf2 (where Vf2 is a drop voltage of the diode 56 according to the fourth embodiment) of the diode 56 and the reference voltage Vr. Therefore, the output of the comparator 220*g* passes through the diode 56, and flows to the voltage dividing resistor 90. The current that flows to the voltage dividing resistor 80 decreases, thereby dropping the output voltage Vo of the power supply circuit 360.

As described above, according to the fourth embodiment, the control circuit 240 of the power supply circuit 360 keeps the voltage across the voltage dividing resistor 90 constant. When the input voltage Vin decreases to make the output voltage of the comparator 220*g* equal to or larger than the sum of the drop voltage Vf2 of the diode 55 and the reference voltage Vr between both ends of the voltage dividing resistor 90, the output of the comparator 220*g* passes through the diode 56, and flows to the voltage dividing resistor 90. When the input current Ii increases to make the output voltage Va of the operational amplifier 220*f* equal to or larger than the sum of the drop voltage Vf of the diode 55 and the reference voltage Vr between both ends of the voltage dividing resistor 90, the output of the operational amplifier 220*f* passes through the diode 55, and flows to the voltage dividing resistor 90. Since the current that flows through the voltage dividing resistor 90 is constant, the current that flows to the voltage dividing resistor 80 decreases, and the output voltage of the power supply circuit 360 drops. Therefore, the output voltage can be stabilized without developing a special power supply control circuit.

A fifth embodiment of the present invention is explained next. A power supply circuit according to the fifth embodiment controls the output voltage when either the input current or the output current of the power supply circuit increases excessively, thereby protecting the input and the output.

Figure 8:
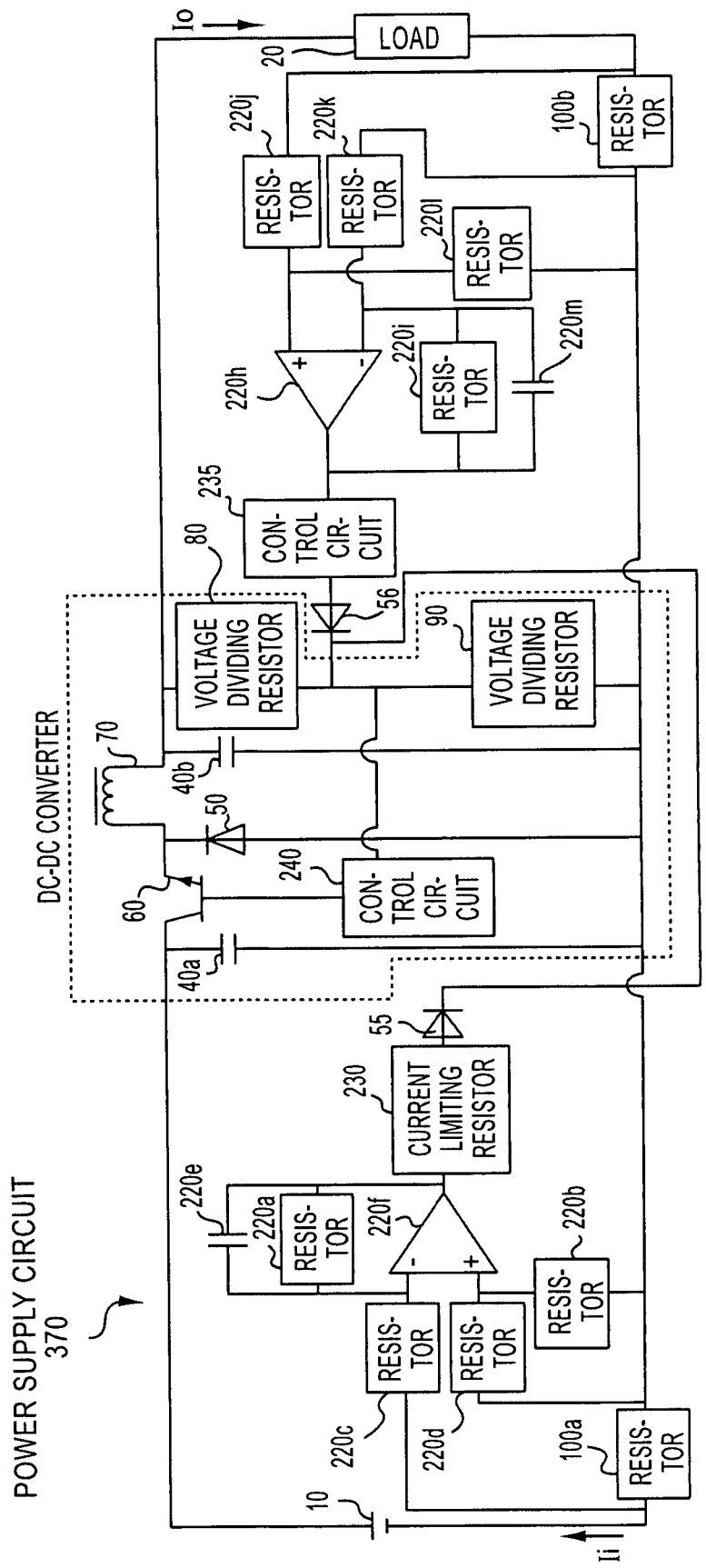
FIG. 8 is a functional block diagram of a configuration of a power supply circuit according to a fifth embodiment.

FIG. 8 is a functional block diagram of the configuration of the power supply circuit according to the fifth embodiment. As shown in FIG. 8, a power supply circuit 370 has the battery 10, the load 20, the diodes 55 and 56, the resistors 100*a*, 100*b*, 220*a*, 220*b*, 220*c*, 220*d*, 220*i*, 220*j*, 220*k*, and 220*l*, the capacitors 220*e* and 220*m*, the operational amplifiers 220*f* and 220*h*, and the current limiting resistors 230 and 235. Other configurations are similar to those of the DC-DC converter shown in FIG. 4, and therefore, like reference numerals denote like constituent elements and their explanation is omitted. In FIG. 8, while a DC-DC converter is a step-down switching power supply circuit, a DC-DC converter of other system, such as a step-up switching power supply circuit, can be also used.

The battery 10, the load 20, the diodes 55 and 56, the resistors 100*a*, 100*b*, 220*a*, 220*b*, 220*c*, 220*d*, 220*i*, 220*j*, 220*k*, and 220*l*, the capacitors 220*e* and 220*m*, the operational amplifiers 220*f* and 220*h*, and the current limiting resistors 230 and 235 are similar to the battery 10, the load 20, the diodes 55 and 56, the resistors 100*a*, 220*a*, 220*b*, 220*c*, and 220*d*, the capacitor 220*e*, the operational amplifier 220*f*, and the current limiting resistors 230 and 235 shown in FIG. 4 or FIG. 5, and therefore, their explanation is omitted.

When the current Ii flows to the input of the power supply circuit 370, the potential of Ii×R8 occurs (where R8 is a resistance of the resistor 100*a* according to the fifth embodiment) across the resistor 100*a*. An output voltage Va1 of the operational amplifier 220*f* is expressed as A×Ii×R8, where A is the amplification of the operational amplifier 220*f*.

Assume that Vf1 denotes a drop voltage of the diode 55, Vr denotes voltage (a reference voltage) across the voltage dividing resistor 90, and Va1 denotes an output voltage of the operational amplifier 220*f*. When the output voltage Va1 of the operational amplifier 220*f* is smaller than the sum of the drop voltage Vf1 and the reference voltage Vr, the diode 55 blocks the output of the operational amplifier 220*f*, and a current cannot be passed to the voltage dividing resistor 90.

In other words, under the following condition shown in an expression (5), the output voltage of the power supply circuit 370 is not affected by the voltage control operation of the present invention, and the power supply circuit 370 executes a normal output operation.

$$Ii < \frac{(Vf1 + Vr)}{A \times R8} \tag{5}$$

When the current Io flows to the output of the power supply circuit 370, a potential of Io×R14 occurs (where R14 is a resistance of the resistor 100*b*) between both ends of the resistor 100*b*. An output voltage Va2 of an operational amplifier 220*h* is expressed as A×Io×R14, where A is the amplification of the operational amplifier 220*h*.

Assume that Vf2 denotes a drop voltage of the diode 56, Vr denotes the reference voltage, and Va2 denotes the output voltage of the operational amplifier 220*h*. When the output voltage Va2 is smaller than the sum of the drop voltage Vf2 and the reference voltage Vr, the diode 56 blocks the output of the operational amplifier 220*h*, and a current cannot be passed to the voltage dividing resistor 90.

In other words, under the following condition shown in an expression (6), the output voltage of the power supply circuit 370 is not affected by the voltage control operation of the present invention, and the power supply circuit 370 executes a normal output operation.

$$Io < \frac{(Vf2 + Vr)}{A \times R14} \tag{6}$$

In other words, when either the expression (5) or the expression (6) is not satisfied, a current flows to the voltage dividing resistor 90 from the operational amplifier 220*f* or 220*h*, thereby controlling the output voltage of the power supply circuit 370.

Specifically, when the input current Ii does not satisfy the condition of the expression (5), the output voltage Va1 of the operational amplifier 220f becomes equal to or larger than the sum of the drop voltage Vf1 and the reference voltage Vr. The output of the operational amplifier 220f passes through the diode 55, and flows to the voltage dividing resistor 90. Therefore, the current that flows to the voltage dividing resistor 80 decreases, and the output voltage of the power supply circuit 370 drops.

On the other hand, when the output current Io does not satisfy the condition of the expression (6), the output voltage Va2 of the operational amplifier 220h becomes equal to or larger than the sum of the drop voltage Vf2 and the reference voltage Vr. Therefore, the output of the operational amplifier 220h passes through the diode 56, and flows to the voltage dividing resistor 90. The current that flows to the voltage dividing resistor 80 decreases, thereby dropping the output voltage of the power supply circuit 370.

As described above, according to the fifth embodiment, the control circuit 240 of the power supply circuit 370 keeps the voltage across the voltage dividing resistor 90 constant. When the input current Ii increases to make the output voltage Va1 of the operational amplifier 220f equal to or larger than the sum of the drop voltage Vf1 of the diode 55 and the reference voltage Vr between both ends of the voltage dividing resistor 90, the output of the operational amplifier 220f passes through the diode 55, and flows to the voltage dividing resistor 90. When the output current Io increases to make the output voltage Va2 of the operational amplifier 220h equal to or larger than the sum of the drop voltage Vf2 of the diode 56 and the reference voltage Vr between both ends of the voltage dividing resistor 90, the output of the operational amplifier 220h passes through the diode 56, and flows to the voltage dividing resistor 90. Since the current that flows through the voltage dividing resistor 90 is constant, the current that flows to the voltage dividing resistor 80 decreases, and the output voltage of the power supply circuit 370 drops. Therefore, the output voltage can be stabilized using general-purpose circuit parts without developing a special power supply control circuit.

A sixth embodiment of the present invention is explained next. A power supply circuit according to the sixth embodiment controls the output voltage when the input voltage of the power supply circuit decreases or when the output current of the power supply circuit increases excessively, thereby protecting the input and the output.

Figure 9:
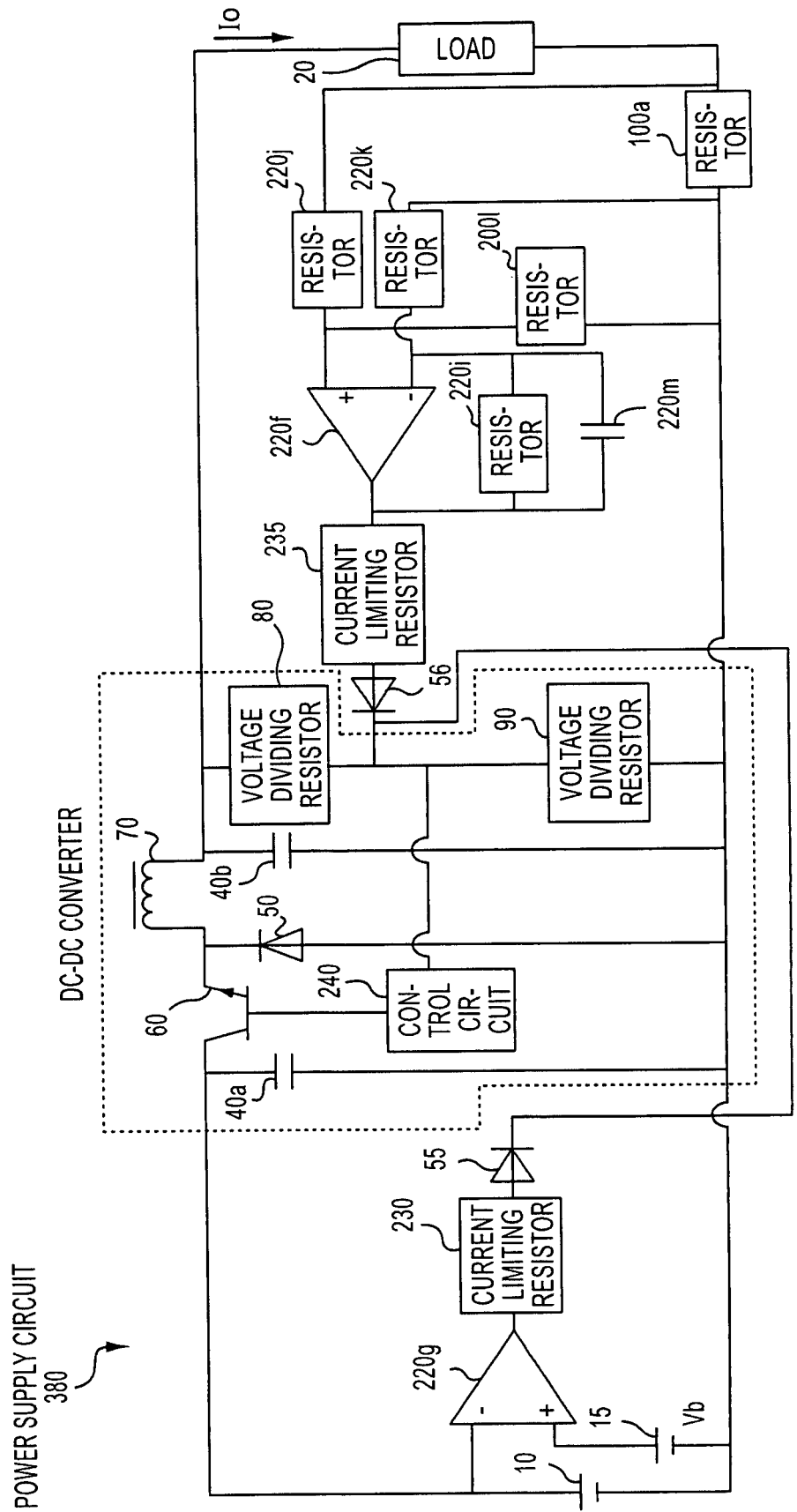
FIG. 9 is a functional block diagram of a configuration of a power supply circuit according to a sixth embodiment.

FIG. 9 is a functional block diagram of the configuration of the power supply circuit according to the sixth embodiment. As shown in FIG. 9, a power supply circuit 380 has the batteries 10 and 15, the load 20, the diodes 55 and 56, the resistors 100a, 220i, 220j, 220k, and 220l, the operational amplifier 220f, the comparator 220g, the capacitor 220m, and the current limiting resistors 230 and 235. Other configurations and operations are similar to those of the DC-DC converter shown in FIG. 4, and therefore, like reference numerals denote like constituent elements and their explanation is omitted.

While a step-down switching power supply circuit is used as a DC-DC converter in FIG. 9, other DC-DC converters, such as a step-up switching power supply circuit, can be also used. In place of the comparator, an amplifier having any gain A can be used.

The batteries 10 and 15, the load 20, the diodes 55 and 56, the resistors 100a, 220i, 220j, 220k, and 220l, the operational amplifier 220f, the comparator 220g, the capacitor 220m, and the current limiting resistors 230 and 235 are similar to the batteries 10 and 15, the diodes 55 and 56, the resistors 100a, 220a, 220b, 220c, and 220d, the capacitor 220e, the operational amplifier 220f, the comparator 220g, and the current limiting resistors 230 and 235 shown in FIG. 4, FIG. 5 or FIG. 6, and therefore, their explanation is omitted.

When the output current Io flows to the power supply circuit 380, the potential of Io×R8 occurs (where R8 is a resistance of the resistor 100a according to the sixth embodiment) between both ends of the resistor 100a. The output voltage Va1 of the operational amplifier 220f is expressed as A×Io×R8, where A is the amplification of the operational amplifier 220f.

Assume that Vf1 denotes a drop voltage of the diode 56, Vr denotes voltage between both ends of the voltage dividing resistor 90, and Va1 denotes an output voltage of the operational amplifier 220f. When the output voltage Va1 is smaller than the sum of the drop voltage Vf1 and the reference voltage Vr, the diode 56 blocks the output of the operational amplifier 220f, and a current cannot be passed to the voltage dividing resistor 90.

In other words, under the following condition shown in an expression (6), the output voltage of the power supply circuit 380 is not affected by the voltage control operation of the present invention, and the power supply circuit 380 executes a normal output operation.

$$Io < \frac{(Vf1 + Vr)}{A \times R8} \qquad (7)$$

When the input voltage Vin is higher than the reference voltage Vb of the comparator 220g (Vin>Vb), the diode 55 blocks the output of the comparator 220g, and a current cannot be passed to the voltage dividing resistor 90. Therefore, when the condition of the expression (6) is satisfied, or when the input voltage Vin is higher than the reference voltage Vb of the comparator 220g, the output voltage of the power supply circuit 380 is not affected by the voltage control operation of the present invention, and the power supply circuit 380 executes a normal output operation.

However, when any one of the two conditions is not satisfied, a current flows to the voltage dividing resistor 90 from the operational amplifier 220f or the comparator 220g, thereby controlling the output voltage of the power supply circuit 380.

Specifically, when the output current Io does not satisfy the condition of the expression (6), the output voltage Va1 of the operational amplifier 220f exceeds the sum of the drop voltage Vf1 and the reference voltage Vr. The output of the operational amplifier 220f passes through the diode 56, and flows to the voltage dividing resistor 90. Therefore, the current that flows to the voltage dividing resistor 80 decreases, thereby dropping the output voltage Vo of the power supply circuit 380.

When the input voltage Vin becomes equal to or smaller than the reference voltage Vb, the output voltage of the comparator 220g becomes equal to or larger than the sum of the drop voltage Vf2 of the diode 56 and the reference voltage Vr. Therefore, the output of the comparator 220g passes through the diode 55, and flows to the voltage dividing resistor 90. The current that flows to the voltage dividing resistor 80 decreases, thereby dropping the output voltage Vo of the power supply circuit 380.

As described above, according to the sixth embodiment, the control circuit 240 of the power supply circuit 380 keeps the voltage across the voltage dividing resistor 90 constant. When the input voltage Vin decreases to make the output voltage of the comparator 220g equal to or larger than the sum of the drop voltage Vf2 of the diode 55 and the reference voltage Vr between both ends of the voltage dividing resistor 90, the output of the comparator 220g passes through the diode 55, and flows to the voltage dividing resistor 90. When the output current Io increases to make the output voltage Va1 of the operational amplifier 220f equal to or larger than the sum of the drop voltage Vf1 of the diode 56 and the reference voltage Vr between both ends of the voltage dividing resistor 90, the output of the operational amplifier 220f passes through the diode 56, and flows to the voltage dividing resistor 90. Since the current that flows through the voltage dividing resistor 90 is constant, the current that flows to the voltage dividing resistor 80 decreases, and the output voltage of the power supply circuit 380 drops. Therefore, the output voltage can be stabilized using general-purpose circuit parts without developing a special power supply control circuit.

A seventh embodiment of the present invention is explained next. A power supply circuit according to the seventh embodiment controls the output voltage when the input voltage of the power supply circuit decreases, when the input current of the power supply circuit increases, or when the output current of the power supply circuit increases excessively, thereby protecting the input and the output.

Figure 10:
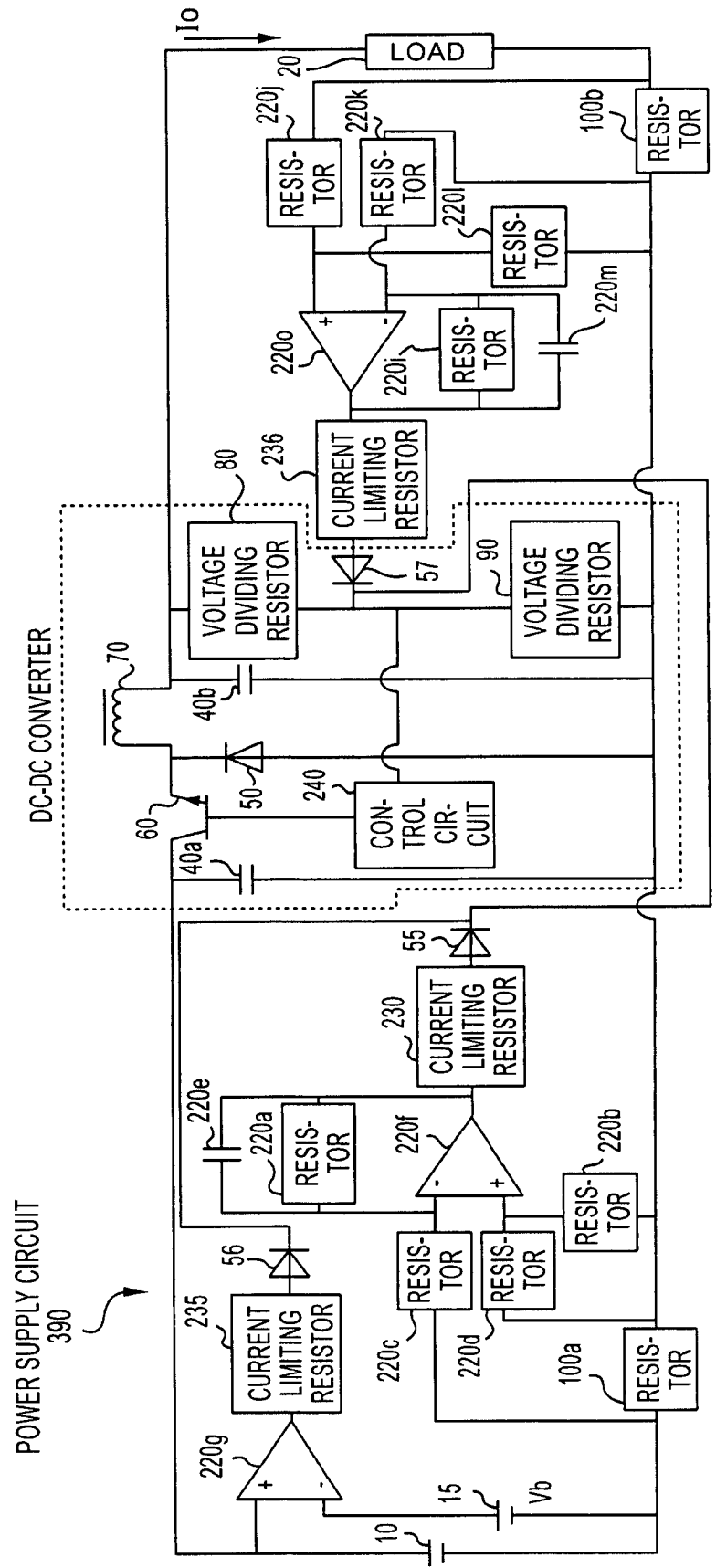
FIG. 10 is a functional block diagram of a configuration of a power supply circuit according to a seventh embodiment.

FIG. 10 is a functional block diagram of the configuration of the power supply circuit according to the seventh embodiment. As shown in FIG. 10, a power supply circuit 390 has the batteries 10 and 15, the load 20, the diodes 55, 56, and 57, the resistors 100a, 100b, 220a, 220b, 220c, 220d, 220i, 220j, 220k, and 220l, the capacitors 220e and 220m, the comparator 220g, the operational amplifiers 220f and 220o, and the current limiting resistors 230, 235, and 236. Other configurations and operations are similar to those of the DC-DC converter shown in FIG. 4, and therefore, like reference numerals denote like constituent elements and their explanation is omitted.

In FIG. 10, while a DC-DC converter is a step-down switching power supply circuit, a DC-DC converter of other system, such as a step-up switching power supply circuit, can be also used. In place of the comparator, an amplifier having an optional amplification A can be used.

The batteries 10 and 15, the load 20, the diodes 55, 56, and 57, the resistors 100a, 100b, 220a, 220b, 220c, 220d, 220i, 220j, 220k, and 220l, the capacitors 220e and 220m, the comparator 220g, the operational amplifiers 220f and 220o, and the current limiting resistors 230, 235, and 236 are similar to the batteries, the load, the diodes, the resistors, the capacitor, the comparator, the operational amplifier, and the current limiting resistors shown in FIG. 4 or FIG. 7, and therefore, their explanation is omitted.

When the current Io flows to the output of the power supply circuit 390, a potential of Io×R15 occurs (where R15 is a resistance of the resistor 100b according to the seventh embodiment) between both ends of the resistor 100b. In this case, the output voltage of the operational amplifier 220o is expressed as A×Io×R15, where A is the amplification of the operational amplifier 220o.

Assume that Vf1 denotes a drop voltage of the diode 57, Vr denotes voltage (hereinafter, a reference voltage) across the voltage dividing resistor 90, and Va1 denotes an output voltage of the operational amplifier 220o. When the output voltage Va1 is smaller than the sum of the drop voltage Vf1 and the reference voltage Vr, the diode 57 blocks the output of the operational amplifier 220o, and a current cannot be passed to between the voltage dividing resistors 80 and 90.

In other words, under the following condition shown in an expression (7), the output voltage of the power supply circuit 390 is not affected by the voltage control operation of the present invention, and the power supply circuit 390 executes a normal output operation.

$$Io < \frac{(Vf1 + Vr)}{A \times R15} \qquad (8)$$

When the current Ii flows to the input of the power supply circuit 390, the potential of Ii×R8 occurs (where R8 is a resistance of the resistor 100a according to the seventh embodiment) across the resistor 100a. In this case, an output voltage of the operational amplifier 220f is expressed as A×Ii× R8, where A is the amplification of the operational amplifier 220f.

Assume that Vf2 denotes a drop voltage of the diode 55, Vr denotes the reference voltage, and Va2 denotes an output voltage of the operational amplifier 220f. When the output voltage Va2 is smaller than the sum of the drop voltage Vf2 and the reference voltage Vr, the diode 55 blocks the output of the operational amplifier 220f, and a current cannot be passed to between the voltage dividing resistors 80 and 90.

In other words, under the following condition shown in an expression (8), the output voltage of the power supply circuit 390 is not affected by the voltage control operation of the present invention, and the power supply circuit 390 executes a normal output operation.

$$Ii < \frac{(Vf2 + Vr)}{A \times R8} \qquad (9)$$

When the input voltage Vin is higher than the reference voltage Vb of the comparator 220g (Vin>Vb), the diode 56 blocks the output of the comparator 220g, and a current cannot be passed to the voltage dividing resistor 90. Therefore, when the conditions of the expression (7) and the expression (8) are satisfied, or when the input voltage Vin is higher than the reference voltage Vb of the comparator 220g, the output voltage of the power supply circuit 390 does not undergo the voltage control operation according to the present invention, and the power supply circuit 390 executes a normal output operation.

However, when any one of the above three conditions is not satisfied, a current flows to the voltage dividing resistor 90 from the operational amplifiers 220f and 220o or the comparator 220g, thereby controlling the output voltage of the power supply circuit 390.

Specifically, when the output current Io does not satisfy the condition of the expression (7), the output voltage Va1 of the operational amplifier 220o becomes equal to or larger than the sum of the drop voltage Vf1 and the reference voltage Vr. The output of the operational amplifier 220o passes through the diode 57, and flows to the voltage dividing resistor 90. Therefore, the current that flows to the voltage dividing resistor 80 decreases, thereby dropping the output voltage Vo of the power supply circuit 390.

When the input current Ii does not satisfy the condition of the expression (8), the output voltage Va2 of the operational amplifier 220f becomes equal to or larger than the sum of the drop voltage Vf2 and the reference voltage Vr. Therefore, the output of the operational amplifier 220f passes through the diode 55, and flows to the voltage dividing resistor 90. The current that flows to the voltage dividing resistor 80 decreases, thereby dropping the output voltage Vo of the power supply circuit 390.

When the input voltage Vin becomes equal to or smaller than the reference voltage Vb, the output voltage of the comparator 220g becomes equal to or larger than the sum of a drop voltage Vf3 (where Vf3 is a drop voltage of the diode 56 according to the seventh embodiment) of the diode 56 and the reference voltage Vr. Therefore, the output of the comparator 220g passes through the diode 56, and flows to the voltage dividing resistor 90. The current that flows to the voltage dividing resistor 80 decreases, thereby dropping the output voltage Vo of the power supply circuit 390.

As described above, according to the seventh embodiment, the control circuit 240 of the power supply circuit 390 keeps the voltage between both ends of the voltage dividing resistor 90 constant. When the input voltage Vin decreases to make the output voltage of the comparator 220g equal to or larger than the sum of the drop voltage Vf3 of the diode 56 and the reference voltage Vr between both ends of the voltage dividing resistor 90, the output of the comparator 220g passes through the diode 56, and flows to the voltage dividing resistor 90.

When the input current Ii increases to make the output voltage Va2 of the operational amplifier 220f equal to or larger than the sum of the drop voltage Vf2 of the diode 55 and the reference voltage Vr between both ends of the voltage dividing resistor 90, the output of the operational amplifier 220f passes through the diode 55, and flows to the voltage dividing resistor 90.

When the output current Io increases to make the output voltage Va1 of the operational amplifier 220o equal to or larger than the sum of the drop voltage Vf1 of the diode 57 and the reference voltage Vr between both ends of the voltage dividing resistor 90, the output of the operational amplifier 220o passes through the diode 57, and flows to the voltage dividing resistor 90. Since the current that flows through the voltage dividing resistor 90 is constant, the current that flows to the voltage dividing resistor 80 decreases, and the output voltage of the power supply circuit 390 drops. Therefore, the output voltage can be stabilized using general-purpose circuit parts without developing a special power supply control circuit.

The power supply circuits according to the first to the seventh embodiments can stabilize the output voltage by using circuit parts that are generally used, without using a special power supply control circuit. Therefore, development cost can be decreased substantially.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A voltage stabilizer for stabilizing a voltage of a circuit, comprising:
   first and second voltage dividing resistors for detecting an output voltage of the circuit;
   a voltage controller that keeps a voltage across the first voltage dividing resistor constant; and
   a current supply unit that supplies a first current between the first voltage dividing resistor and the second voltage dividing resistor when a second current in the circuit becomes equal to or larger than a predetermined value, such that the flow of the second current is not terminated.

2. The voltage stabilizer according to claim 1, wherein the current supply unit supplies the first current when an input voltage of the circuit becomes equal to or smaller than a predetermined value.

3. The voltage stabilizer according to claim 1, wherein the current supply unit includes
   an output current detector that detects an output current of the circuit; and
   an output current amplifying unit that amplifies the output current detected, wherein
   the current supply unit supplies the current through any one of a resistor and a diode or both when the output current detected becomes equal to or larger than the predetermined value.

4. The voltage stabilizer according to claim 1, wherein the current supply unit includes
   an input current detector that detects an input current of the circuit; and
   an input current amplifying unit that amplifies the input current detected, wherein
   the current supply unit supplies the current through any one of a resistor and a diode or both when the input current detected becomes equal to or larger than the predetermined value.

5. The voltage stabilizer according to claim 2, wherein the current supply unit further includes
   an input voltage comparing unit that compares the input voltage of the circuit with a reference voltage set in advance, wherein
   the current supply unit supplies the current through any one of a resistor and a diode or both when the input voltage compared becomes equal to or smaller than the reference voltage.

6. A voltage stabilizing method for stabilizing a voltage of a circuit with a first and second voltage dividing resistor for detecting an output voltage of the circuit, the method comprising:
   keeping a voltage across the first voltage dividing resistor constant; and
   supplying a first current between the first voltage dividing resistor and the second voltage dividing resistor when a second current in the circuit becomes equal to or larger than a predetermined value, such that the flow of the second current is not terminated.

7. The voltage stabilizing method according to claim 6, wherein the supplying includes supplying the first current when an input voltage of the circuit becomes equal to or smaller than a predetermined value.

8. The voltage stabilizing method according to claim 6, wherein the supplying includes
   detecting an output current of the circuit; and
   amplifying the output current detected, wherein
   the supplying includes supplying the first current through any one of a resistor and a diode or both when the output current detected becomes equal to or larger than the predetermined value.

9. The voltage stabilizing method according to claim 6, wherein the supplying includes
   detecting an input current of the circuit; and
   amplifying the input current detected, wherein
   the supplying includes supplying the first current through any one of a resistor and a diode or both when the input current detected becomes equal to or larger than the predetermined value.

10. The voltage stabilizing method according to claim 7, wherein the supplying includes
    comparing the input voltage of the circuit with a reference voltage set in advance, wherein
    the supplying includes supplying the first current through any one of a resistor and a diode or both when the input voltage compared becomes equal to or smaller than the reference voltage.

* * * * *